Dec. 27, 1966   H. C. FLINT   3,294,442
ADJUSTABLE BACKREST SUPPORT
Filed Nov. 17, 1965

INVENTOR.
Hyland C. Flint
BY
Barnard, McGlynn & Reising
ATTORNEYS

United States Patent Office 3,294,442
Patented Dec. 27, 1966

3,294,442
ADJUSTABLE BACKREST SUPPORT
Hyland C. Flint, 3551 Walnut Lake Road, Rte. 2,
Orchard Lake, Mich. 48033
Filed Nov. 17, 1965, Ser. No. 508,228
10 Claims. (Cl. 297—298)

This invention relates to backrest support means, and more particularly to adjustable backrest support means adaptable to a unison action seat structure.

In United States patent application Serial No. 469,516, filed July 6, 1965, in the name of Hyland C. Flint, and entitled, "Backrest Support Means," there is disclosed a unison action seat structure of the type typically used in trucks, or the like, wherein a backrest support frame resiliently supports a backrest member for forward and rearward movement, such back member being also movable upwardly and downwardly with deflection of the seat member.

In certain seating installations utilizing a seat structure such as described in the aforementioned application, it is desirable to provide adjustment means for the angular position of the backrest member relative to the seat member. For example, in some truck installations, and particularly where the vehicle is used for long distance hauling, it is much to the operator's comfort and safety if he is able to adjust the backrest position periodically to change his seating posture.

It is here proposed to provide a seat assembly having a seat member and a backrest member and including an adjustable backrest support structure that will permit variation in the angular relationship between the backrest member and the seat member. This may be accomplished by varying the angular position of the backrest support frame relative to the base frame, or other structure on which such backrest support frame is mounted. A rod member, mounted in such base frame, extends transversely of the back support frame, the back support frame being pivotally mounted on the base frame. Mounted on the rod member are cams which engage the backrest support frame and which are rotatable between first and second positions. The cams are so arranged to permit rearward positioning of the backrest support frame in one position, and to rotate over the horizontal center of the cam members to a second position, where the backrest member is pivoted forwardly, thereby decreasing the angular relationship between the backrest and the seat. By such over-center rotation, the cams are locked by the weight of the user in either the first or second position. At the same time, the mounting of the backrest support frame to the base frame, or other fixed structure, is such that the resilience for the backrest support is not lost by moving the structure from one position to another.

Such a backrest support assembly permits the desired adjustment for the ease and comfort of the user of the seat in a simple and economical manner, there being few parts to assemble and operate. The resilient support is maintained for the backrest member, and the adjustment assembly does not take up an inordinate amount of space within the vehicle in situations where space is at a premium.

These and other advantages will become more apparent from the following description and drawing in which.

Figure 2:
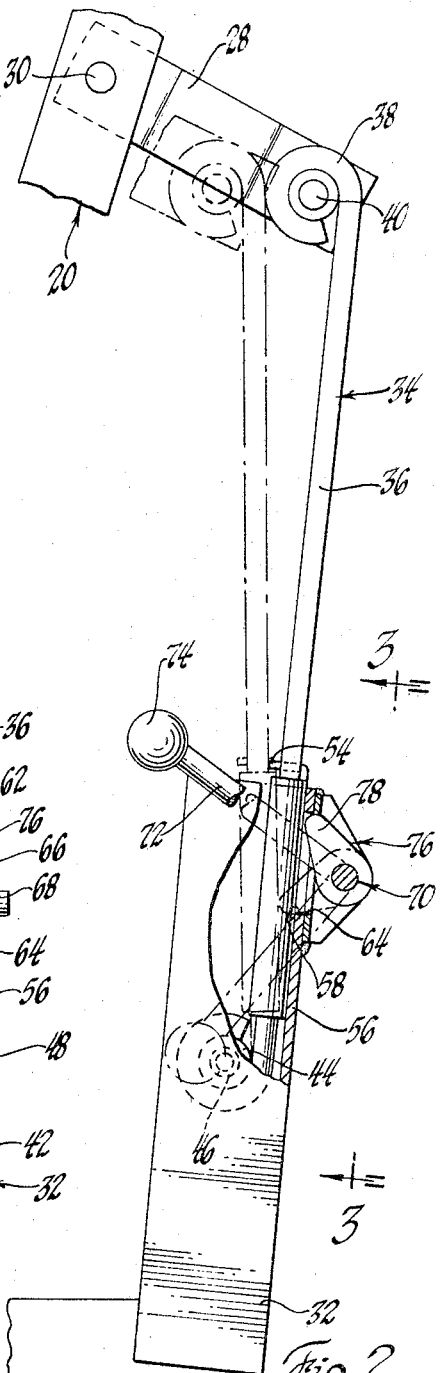
FIGURE 2 is an enlarged view of a portion of the structure illustrated in FIGURE 1, with parts broken away and in section, illustrating the backrest frame and the angular adjustment mechanism.
Figure 3:
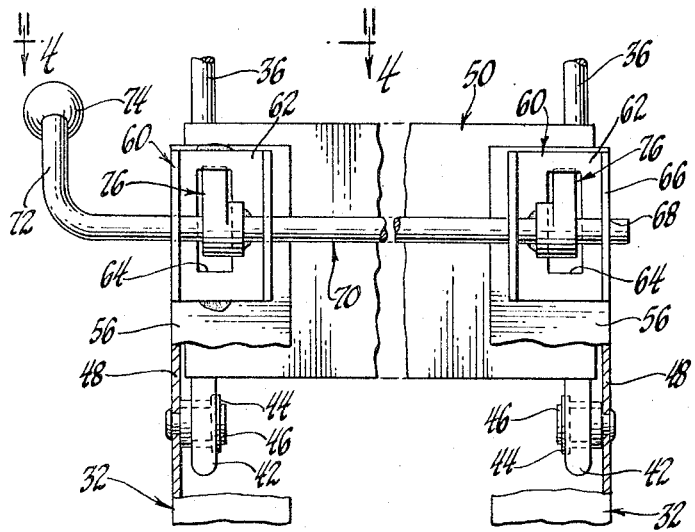
Figure 4:
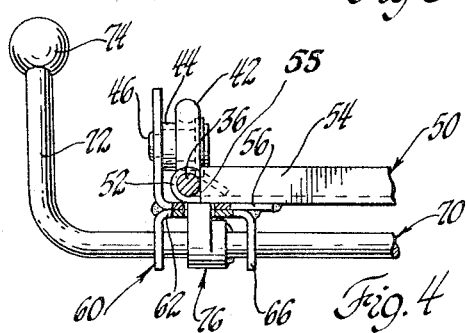

FIGURE 3 is an elevational view of the structure illustrated in FIGURE 2, taken substantially along the line 3—3 of FIGURE 2, and looking in the direction of the arrows, with parts broken away and in section to illustrate the position of the various parts; and FIGURE 4 is a cross-sectional view of a portion of the structure illustrated in FIGURES 2 and 3, taken substantially along the line 4—4, and looking in the direction of the arrows.

Figure 1:
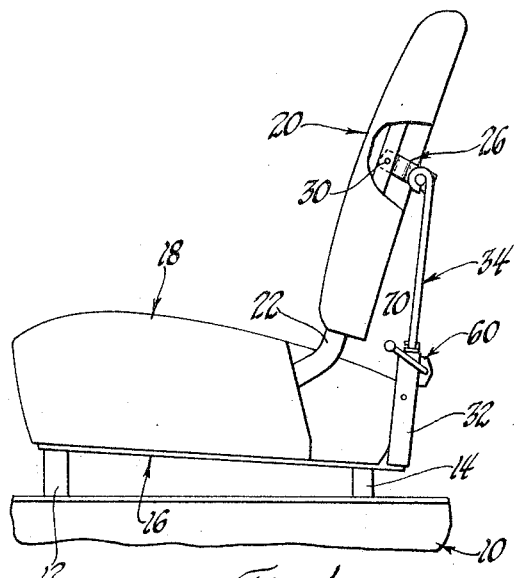
FIGURE 1 is an elevational view of a seat structure embodying the invention, and illustrating the position of the various parts.

Referring more particularly to the drawing, FIGURE 1 illustrates a unison action seat structure of the general type disclosed in the aforementioned U.S. application Serial No. 469,516. Such a seat structure may be employed in a vehicle, such as a truck or the like, having a supporting floor, indicated generally by the numeral 10, from which may extend supporting members 12 and 14 to support a seat base frame, indicated generally by the numeral 16. It is to be understood at the outset that the structure herein illustrated and described is not restricted to truck seating or motor vehicle seating, but to any seating structure of the unison action type. Truck seating is specifically referred to because it best illustrates the severity of the various conditions to which seating of this type may be subjected.

Mounted on the base frame 16 is a seat member, indicated generally by the numeral 18, which may be of any suitable type and may employ springs and other upholstery material to provide a comfortable seating cushion. Mounted above the seat member 18 is a backrest member, indicated generally by the numeral 20, such backrest member including side frame members 22 which extend downwardly and forwardly to a pivot connection, not shown. Such pivot connection is made to the springs at the "A" point of the seat cushion as described in the aforementioned application. That is, the connection is at the point receiving the concentrated seating load, the connection and arms 22 being movable upwardly and downwardly with the springs in the seat member 18 as the seat is deflected by the weight of the user and under jolts and bounces. Backrest member 20 includes suitable springs and other upholstery support for the comfort of the user. Extending between the side frame member 22 of the backrest member 20 is a U-shaped yoke member, indicated generally by the numeral 26. Yoke member 26 includes forwardly directed legs 28 which are pivotally secured by pivot pins 30 in the side frame members 22.

Secured to the base frame 16 and at the rearward corners thereof, and extending upwardly therefrom, are frame members, indicated generally by the numeral 32. Such frame members receive a backrest support frame, indicated generally by the numeral 34.

Back support frame 34 includes spring wire members 36 having loops 38 formed in the upper ends thereof to be received on pivot pins 40 secured in the yoke member 28. Such loops 38 and pins 40 permit pivotal movement of the yoke member relative to the spring wire elements 36. At the lower end of the spring wire elements 36 are loops 42 which receive bushings 44. Bushings 44 are pivotally mounted on pivot studs 46 which are in turn secured in sidewalls 48 of the frame members 32. Such mounting permits pivotal movement of the spring wire members 36 relative to the base frame 16 for purposes to become hereinafter more apparent.

Extending between the wire members 36 and at the base thereof is a plate structure, indicated generally by the numeral 50, having its ends 52 rolled around the spring wire members 36 for securement thereto. Extending forwardly from the upper edge of the plate 50 is a flange 54 having ends 55 abutting the spring wire members 36. Plate member 50, with its rolled portions 52 and flange 54, provides a rigid connection between the spring wire members 36 for stability of the backrest support frame 34.

The rearward walls 56 of frame members 32 are provided with elongated slots 58 adjacent the upper ends thereof for purposes to become hereinafter more apparent.

Secured to the rearward walls 56 of the frame members 32, in any suitable manner, are bracket members, indicated generally by the numeral 60. Such bracket members 60 include plate portions 62 provided with slots 64 disposed in registry with the slots 58 in the frame members 32. Extending outwardly from the plate portions 62 of the bracket members 60 are ears 66, extending rearwardly from the frame members 32. Each of the ears 66 is provided with an aperture 68, all of such apertures being in substantial horizontal alignment to receive an actuating rod, indicated generally by the numeral 70. Rod 70 passes through the apertures 68 to extend transversely of the back supporting frame 34, and includes a forwardly bent portion 72 to which is suitably attached an enlargement or handle 74.

Mounted on rod 70 are cams, indicated generally by the numeral 76, such cams being rigidly secured to the rod 70, as by welding or the like, to be rotatable therewith. Cams 76 include nose portions 78 which extend through the elongated slots 64 and 58 in the brackets 60 and channel members 32 respectively, to engage the rearward surface of the plate 50 extending between the spring wire members 36. Cams 76 are so constructed that in the upward position, as illustrated in full lines in FIGURE 2, the back support frame 34 is in an extreme rearward position with the plate member 50 engaging the rear wall 56 of the frame members 32. The noses 78 of the cams 76 are limited in this position by the upper edge of the slot 64 in the bracket 60. Upon rotating the rods 70, by means of the handle 74 and bent portion 72, the cams 76 are rotated downwardly, to a limiting position in engagement with the edges of the slot 58 in the channel members 32 to the position shown in dashed and dotted lines in FIGURE 2. In such downward position the noses 78 of the cams 76 bear against the plate member 50 and push the back supporting frame 34 forwardly, causing the wire members 36 to pivot about shafts 46 and causing the backrest member 20 to change its angularity relative to the seat member 18.

The rotation of cams 76 from the full up to the full down positions, as illustrated in FIGURE 2, requires the noses of the cams to pass over center of the horizontal center plane of shaft 70. Such action permits the weight of the user, as well as the weight of the backrest member, to be taken advantage of in holding the cams 76 in their respective positions. Thus, in either upward or downward positions the cams are securely held in place by the occupant of the seat as well as the weight of the seat elements.

Thus, an adjustable backrest support assembly is provided for a unison action seat which permits variation in the angularity between the backrest member and the seat member for the comfort of the user. Such an assembly is composed of relatively few parts, and is easily actuated to adjust the backrest member. Such device is simple to install and may be provided in presently existing seating structures without undue alteration or modification.

Various modifications and alterations will occur to those having skill in the art after having had reference to the foregoing description and drawings. However it is not intended to limit the scope of the invention by the foregoing description and drawings but by the scope of the appended claims.

The embodiments of the invention in which an exclusive property or privilege is claimed are defined as follows:

1. In a seat structure having a base frame and a back member pivotally secured to a seat member mounted on said base frame and a back support frame mounted on said base frame and pivotally secured to said back member and including upwardly extending support members, means for changing the angular position of said back member relative to said seat member and comprising:
    bracket members mounted on said base frame and having elongated slots formed therein;
    a rod extending transversely of said back member and pivotally secured in said bracket members;
    and cams secured to said rod adjacent said bracket members and extending through said slots therein, said cams engaging said back support frame and being rotatable with rotation of said rod to move said back support frame and said back member between first and second angular positions relative to said seat member.

2. The seat structure set forth in claim 1 wherein said cams engage first and second edges of said slots to limit movement thereof between said first and second positions.

3. The seat set forth in claim 2 wherein said base support frame further includes substantially vertical elements extending from said base frame, said elements having said bracket members secured thereto and having elongated slots therein in registry with said slots in said bracket members.

4. The seat set forth in claim 2 wherein said cams are rotated past the horizontal centerline of said rod in moving from said first and second positions.

5. The seat structure set forth in claim 1 wherein said back support frame is pivotally mounted on said base frame.

6. The seat structure set forth in claim 1 wherein said support members terminate in pivot receiving portions, and pivot shafts extend from said base frame for receiving said pivot receiving portions to permit pivotal movement of said back support frame relative to said base frame.

7. The seat structure set forth in claim 6 and further including a plate member extending between said upwardly extending support members and being secured thereto for providing stability to said back support frame.

8. In a seat structure having a base frame and a back member pivotally secured to a seat member mounted on said base frame and a back support frame mounted on said base frame and pivotally secured to said back member and including upwardly extending support members, means for changing the angular position of said back member relative to said seat member and comprising:
    a rod member extending transversely of said base frame and rotatably secured thereto;
    and cam means secured to said rod member and rotatable therewith between first and second positions, said cam means engaging said back support frame and moving said back support frame and said back member between first and second angular positions relative to said seat member.

9. The seat structure set forth in claim 8 wherein said back support frame is pivotally mounted on said base frame.

10. The seat structure set forth in claim 8 wherein said support members terminate in pivot receiving portions, and pivot shafts extend from said base frame for receiving said pivot receiving portions to permit pivotal movement of said back support frame relative to said base frame.

References Cited by the Examiner

UNITED STATES PATENTS

| | | | |
|---|---|---|---|
| 1,359,145 | 11/1920 | Atwood | 297—304 |
| 2,403,198 | 7/1946 | Sheldrick et al. | 297—301 |
| 2,456,797 | 12/1948 | Sheldrick | 297—301 |
| 2,471,024 | 5/1949 | Cramer | 297—301 |
| 2,557,736 | 6/1951 | Fox | 297—305 |
| 2,599,301 | 6/1952 | Van Buren | 297—306 |
| 2,901,027 | 8/1959 | Dickson | 297—305 |
| 3,133,763 | 4/1964 | Stoll et al. | 297—304 |

FRANK B. SHERRY, *Primary Examiner.*

G. O. FINCH, *Assistant Examiner.*